US009963014B2

(12) United States Patent
Good et al.

(10) Patent No.: US 9,963,014 B2
(45) Date of Patent: May 8, 2018

(54) DEBRIS BARRIER FOR VEHICLE OPERATOR CAB

(71) Applicant: Joy MM Delaware, Inc., Wilmington, DE (US)

(72) Inventors: Tyler Good, Smicksburg, PA (US); Siva Kumar Bunnuru, Hyderabad (IN)

(73) Assignee: Joy MM Delaware, Inc., Wilmington, DE (US)

( * ) Notice: Subject to any disclaimer, the term of this patent is extended or adjusted under 35 U.S.C. 154(b) by 194 days.

(21) Appl. No.: 14/996,386

(22) Filed: Jan. 15, 2016

(65) Prior Publication Data

US 2017/0203636 A1  Jul. 20, 2017

(51) Int. Cl.
  *B60H 1/24* (2006.01)
  *B60H 1/00* (2006.01)
  *B62D 33/06* (2006.01)

(52) U.S. Cl.
  CPC ......... *B60H 1/247* (2013.01); *B60H 1/00378* (2013.01); *B62D 33/0612* (2013.01); *B62D 33/06* (2013.01)

(58) Field of Classification Search
  CPC .... B60H 1/247; B60H 1/00378; B62D 33/06; B62D 33/0612
  USPC .................................................... 296/190.09
  See application file for complete search history.

(56) References Cited

U.S. PATENT DOCUMENTS

| 1,688,104 | A | * | 10/1928 | Bang | B60J 1/2005 296/91 |
| 2,817,281 | A | * | 12/1957 | Schwan | B60H 1/00378 135/16 |
| 3,126,810 | A | * | 3/1964 | Karlsson et al. | A01D 41/1252 454/189 |
| 3,696,732 | A | * | 10/1972 | Rodgers | B60J 1/2002 296/91 |
| 3,776,358 | A | * | 12/1973 | Williams | B60H 1/00378 15/250.01 |
| 3,868,896 | A | * | 3/1975 | Doll | B60H 1/00378 454/137 |
| 4,072,487 | A | * | 2/1978 | Irwin | B60H 1/00378 454/151 |
| 4,123,967 | A | | 11/1978 | Shanis | |
| 4,606,259 | A | | 8/1986 | Nystrom | |
| 4,660,462 | A | * | 4/1987 | Thompson | B01D 61/08 454/158 |
| 5,113,749 | A | | 5/1992 | Perbix | |
| 6,565,035 | B1 | | 5/2003 | Kim et al. | |

(Continued)

FOREIGN PATENT DOCUMENTS

| CN | 203486026 U | * | 3/2014 |
| DE | 2300410 A | * | 7/1974 |
| JP | 2005178503 A | * | 7/2005 |

*Primary Examiner* — Hilary L Gutman
(74) *Attorney, Agent, or Firm* — Michael Best & Friedrich LLP (57) ABSTRACT

A vehicle includes an operator cab having a frame defining an opening and a permeable material sheet mounted adjacent the frame to at least partially cover the opening. The permeable material sheet has a plurality of apertures. The operator cab further includes an air nozzle positioned proximal to the opening and positioned so that the air nozzle directs an airflow to contact at least a portion of the permeable material sheet to form a swirling air current proximal to at least one of the plurality of apertures.

20 Claims, 5 Drawing Sheets

(56) References Cited

U.S. PATENT DOCUMENTS

| | | |
|---|---|---|
| 8,702,481 B1 | 4/2014 | Wilbourn et al. |
| 2005/0282485 A1 | 12/2005 | Kato et al. |
| 2010/0233951 A1 | 9/2010 | Horowitz et al. |
| 2011/0097985 A1 | 4/2011 | Stauffer et al. |
| 2012/0208446 A1* | 8/2012 | Taylor ................ B60H 1/00378 454/158 |
| 2012/0276832 A1 | 11/2012 | Quaak et al. |
| 2013/0284028 A1 | 10/2013 | Fan et al. |

* cited by examiner

DEBRIS BARRIER FOR VEHICLE OPERATOR CAB

FIELD OF THE INVENTION

The present invention relates to a vehicle operator cab having an opening and apparatus for preventing dust, debris, etc. from passing through the opening.

BACKGROUND OF THE INVENTION

Underground mining vehicles include an operator cab to protect the vehicle operator from the harsh, underground mine environment. For example, airborne, respirable dust in an underground mine can be harmful to an operator. In addition to protection from the environment, an operator cab must also provide adequate visibility for the operator to be able to see the vehicle and surrounding environment.

SUMMARY OF THE INVENTION

In one embodiment, the invention provides a vehicle including an operator cab. The operator cab having a frame defining an opening and a permeable material sheet mounted adjacent the frame to at least partially cover the opening. The permeable material sheet has a plurality of apertures. The operator cab further includes an air nozzle positioned proximal to the opening and positioned so that the air nozzle directs an airflow to contact at least a portion of the permeable material sheet to form a swirling air current proximal to at least one of the plurality of apertures.

In another embodiment the invention provides an apparatus defining an opening and creating a barrier covering the opening. The apparatus includes a frame defining the opening and a permeable material sheet mounted on the frame and at least partially covering the opening. The permeable material sheet has a plurality of apertures. The apparatus further includes at least one nozzle mounted adjacent the frame. The nozzle is in fluid communication with a pressurized air source to create an air curtain directed along the permeable material sheet such that the air curtain contacts at least a portion of the permeable material sheet to form a boundary layer adjacent to the permeable material sheet and a plurality of swirling air currents within the plurality of apertures to prevent debris from traveling through the opening.

In another embodiment, the invention provides an operator cab for a vehicle. The operator cab includes a frame defining an opening and a permeable material sheet mounted adjacent the frame to at least partially cover the opening. The permeable material sheet having a plurality of apertures. The operator cab further includes a plurality of air nozzles positioned proximal to the opening and positioned so that the air nozzles direct airflow to contact at least a portion of the permeable material sheet to form a plurality of swirling air currents. The plurality of swirling air currents being formed within the plurality of apertures. The plurality of air nozzles are positioned so that the airflow that contacts at least a portion of the permeable material sheet also forms a boundary layer adjacent to the permeable material sheet. The boundary layer includes a turbulent airflow portion and a laminar airflow portion. The turbulent airflow portion is positioned closer to the permeable material sheet than the laminar airflow portion. The airflow and the portion of the permeable material sheet in contact with the airflow are transparent such that light passes through the airflow and the portion of the permeable material sheet in contact with the airflow without being reflected as a glare.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
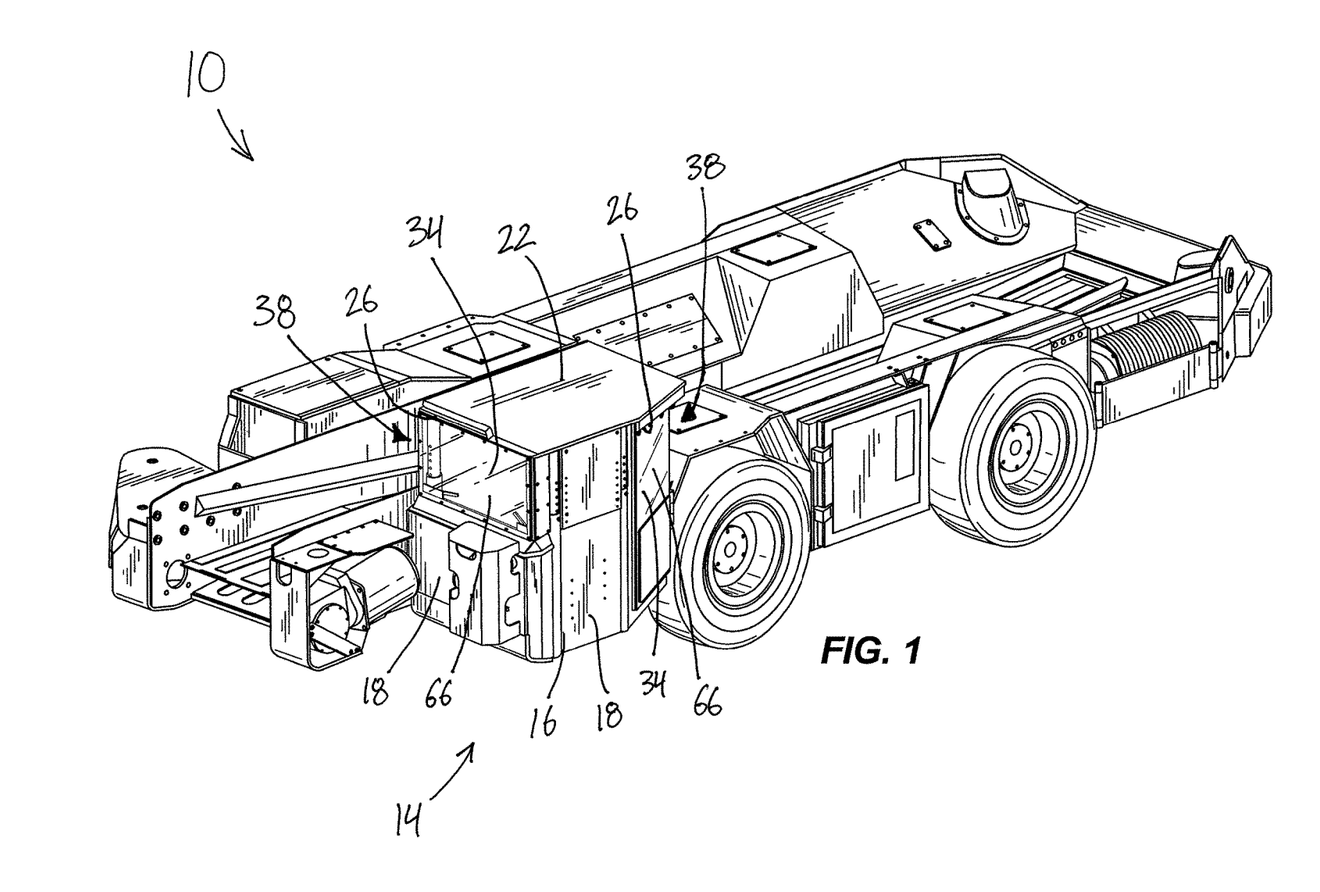
FIG. 1 is a perspective view of a shuttle car including an operator cab in accordance with an embodiment of the invention.

FIG. 1 illustrates an underground mining vehicle 10 (e.g., a shuttle car) including an operator cab 14 in which an operator may be seated and control the vehicle 10. The operator cab 14 includes a frame 16 having side portions 18 and a canopy 22 (i.e., a roof) mounted to the side portions 18 at a first end 26 of each of the side portions 18. The frame 16 partially defines a cab interior 30 (FIG. 6) of the operator cab 14. The frame 16 defines an opening 34 provided within each of the side portions 18 to allow the operator to see out of the operator cab 14. In some embodiments, openings are provided in less than all of the side portions 18. The operator cab 14 further includes a barrier 38 to cover the opening 34 and prevent external contaminants (e.g., debris, respirable dust, etc.) from passing through the opening 34 and into the cab interior 30 of the operator cab 14, as explained in greater detail below.

Figure 2:
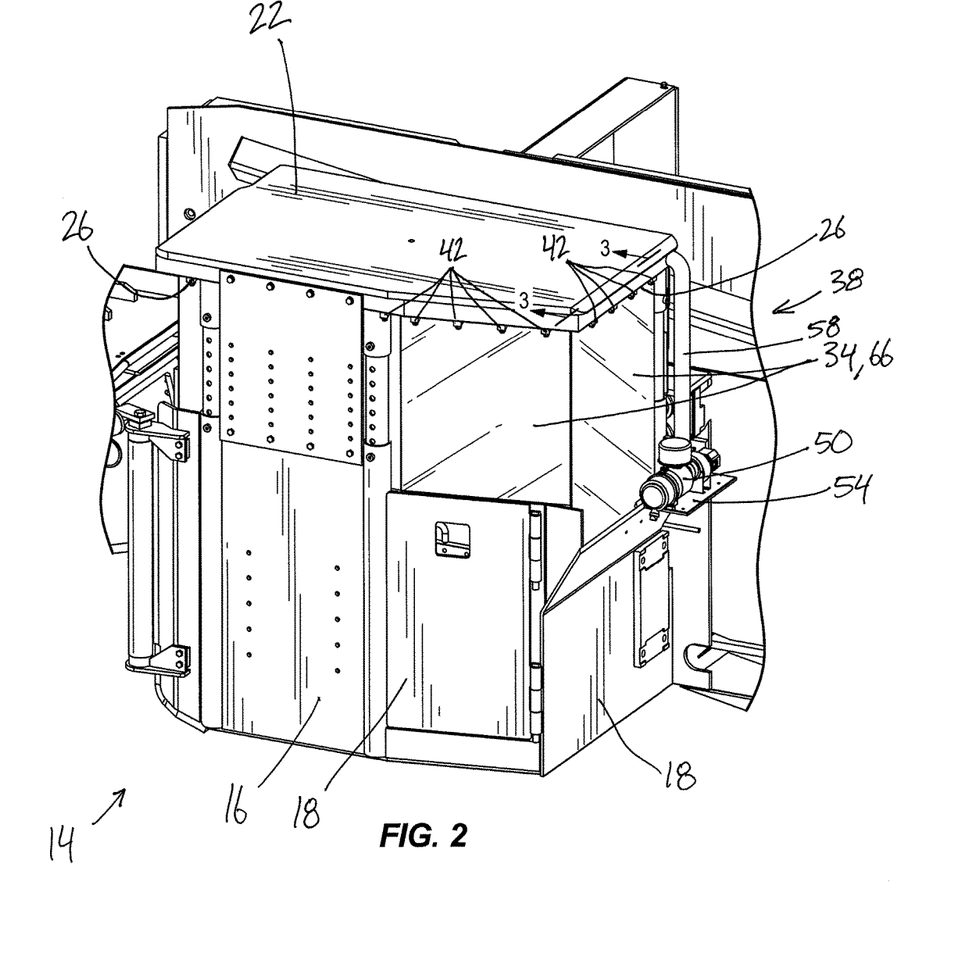
FIG. 2 is an enlarged perspective view of the operator cab of FIG. 1.
Figure 3:
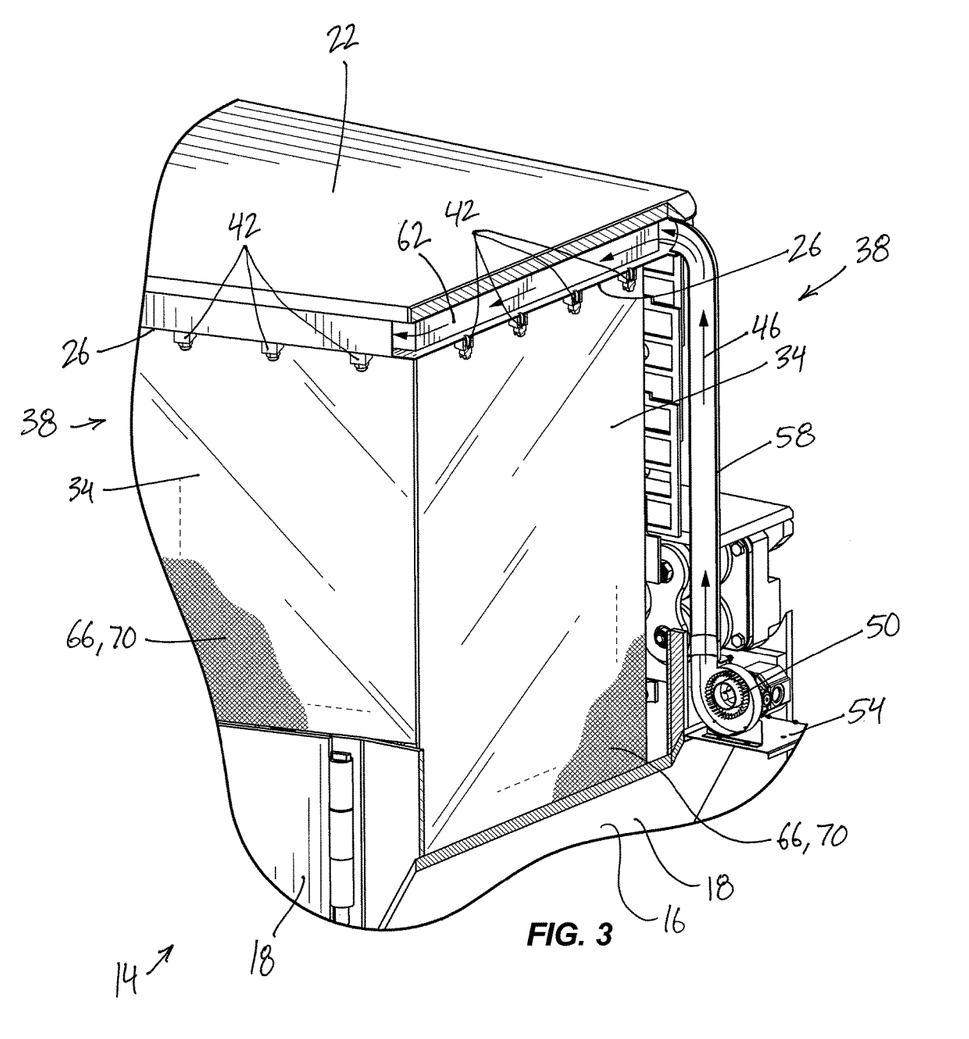
FIG. 3 is a cross-sectional view of the operator cab of FIG. 1 taken along the line 3-3 in FIG. 2.

As shown in FIGS. 2 and 3, a plurality of air nozzles 42 are mounted to the canopy 22 to project and direct a supply of air 46 generated by a source of pressurized air 50 (e.g., an air compressor, an air pump, a fan, an impeller, etc.) The source of pressurized air 50 is mounted to one of the side portions 18 with a mounting bracket 54. The air nozzles 42 are positioned proximal to the openings 34 and are oriented away from the canopy 22 (i.e., the air nozzles 42 are directed downwards). In addition, the air nozzles 42 are angled toward the side portions 18 of the operator cab 14, as explained in further detail below. In alternative embodiments, any number of air nozzles 42 may be utilized, including a single air nozzle.

Referring specifically to FIG. 3, a duct 58 is positioned between the source of pressurized air 50 and an air plenum 62 positioned in the canopy 22. The duct 58 and the air plenum 62 place the plurality of air nozzles 42 in fluid communication with the source of pressurized air 50. In other words, the air plenum 62 is in fluid communication with the source of pressurized air 50 and the plurality of air nozzles 42. In some embodiments, the air is filtered and cleaned between the source of pressurized air 50 and the plurality of air nozzles 42 (e.g., by passing through a HEPA filter).

The barrier 38 includes a permeable material sheet 66 (e.g., a mesh, a screen, a permeable barrier, a layer of permeable plastic material, a porous material layer, a penetrable material layer, etc.) with a plurality of apertures 70 (e.g., holes, perforations, openings, channels, etc.). For clarity, only a portion of the plurality of apertures 70 are illustrated on the permeable material sheet 66 of FIGS. 3-5 and the apertures 70 are not shown in FIGS. 1 and 2. It is understood that the permeable material sheet 66 is formed completely of apertures 70. In some embodiments, the permeable material sheet is a woven screen of metal, plastic or other synthetic material. The permeable material sheet 66 is mounted adjacent the frame 16 to at least partially cover the opening 34, and in the illustrated embodiment the permeable material sheet 66 covers the entirety of the opening 34.

Figure 4:
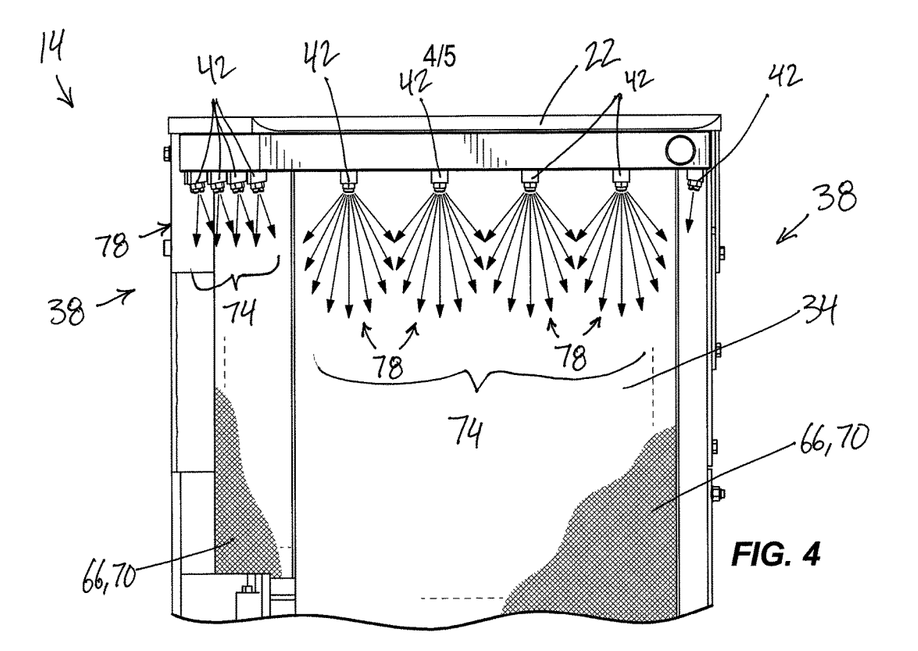
FIG. 4 is a front view of the operator cab of FIG. 1 schematically showing an airflow.
Figure 5:
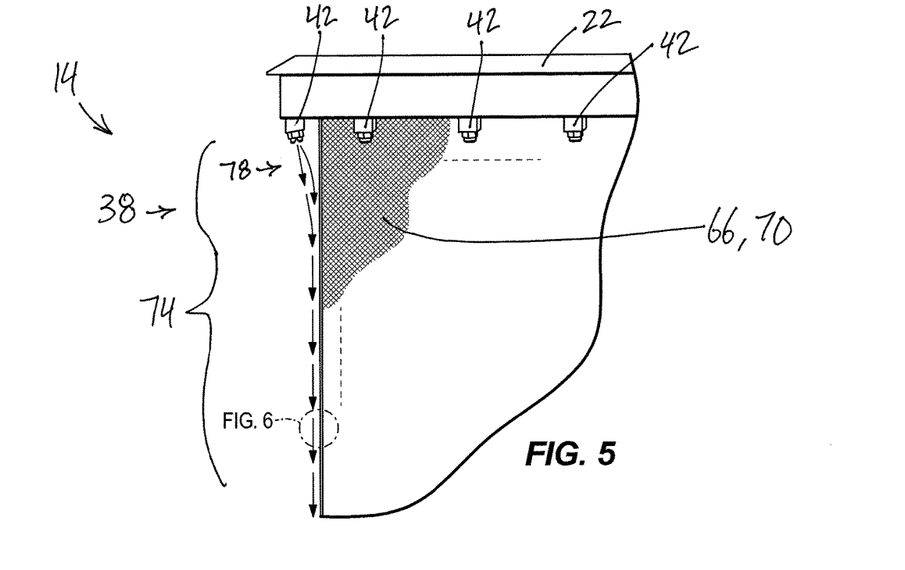
FIG. 5 is a side view of the operator cab of FIG. 1, schematically showing the airflow of FIG. 4.

Referring to FIGS. 4 and 5, the barrier 38 further includes an air curtain 74 projecting from the plurality of air nozzles 42 that contacts at least a portion of the permeable material sheet 66 and covers at least a portion of the opening 34. Each of the plurality of air nozzles 42 project air jets 78 downward and along the opening 34. The air jets 78 collectively form the air curtain 74 along the permeable material sheet 66. As shown in FIG. 5, the air nozzles 42 are oriented at an angle toward the permeable material sheet 66 such that the air jets 78 make contact with the permeable material sheet 66 directly below the air nozzles 42. In other words, the nozzles 42 are oriented non-orthogonally to the canopy 22 (FIG. 5). In the illustrated embodiment, the air curtain 74 contacts over half of the permeable material sheet 66. With reference to FIG. 4, the air jets 78 diffuse across the opening 34 into a cone shape, covering the opening 34. In alternative embodiments, the air jets 78 diffuse across the opening 34 into alternative shapes covering the opening 34 (e.g., a thin, rectangular line of airflow). The air jets 78 collectively create the air curtain 74, which works in tandem with the permeable material sheet 66 to create the barrier 38 for preventing the infiltration of debris through the opening 34. In this way, the air quality within the operator cab 14 is controlled.

Figure 6:
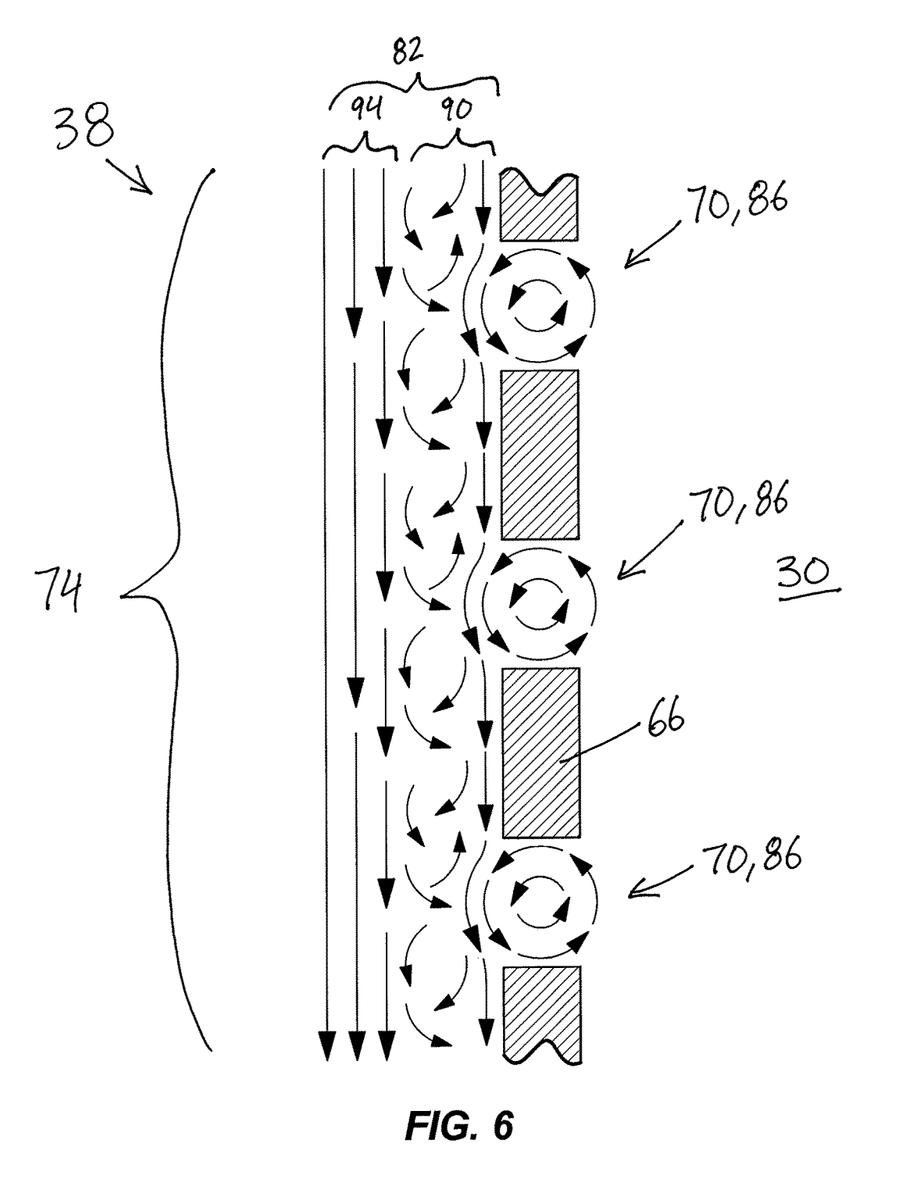
FIG. 6 is an enlarged partial side view of the operator cab of FIG. 5, schematically showing the airflow detail.

As shown in FIG. 6, the air curtain 74 contacts the permeable material sheet 66 and creates a boundary layer 82 adjacent to and along the permeable material sheet 66 with a plurality of swirling air currents 86 (i.e., eddy air currents) positioned proximal to the plurality of apertures 70. In the illustrated embodiment, the swirling air currents 86 are positioned within the plurality of apertures 70. The boundary layer 82 of the air curtain 74, which is positioned adjacent to the permeable material sheet 66, includes a turbulent airflow portion 90 and a laminar airflow portion 94. The turbulent airflow portion 90 is positioned closer to the permeable material sheet 66 than the laminar airflow portion 94. The farther away from the permeable material sheet 66, the boundary layer 82 includes airflow speeds that increase until the edge of the boundary layer 82 is reached. Arrow lengths depicted in FIG. 6 are indicative of the relative air velocity of the air curtain 74. In other words, the laminar airflow portion 94 includes faster moving air further away from the permeable material sheet 66.

The swirling air currents 86 are created within the apertures 70, and the swirling air currents 86 assist with the formation and integrity of the boundary layer 82 to keep contaminants from passing through the apertures 70. In other words, the swirling, eddy air currents 86 in the apertures 70 of the permeable material sheet 66 help maintain the boundary layer 82 of the air curtain 74. In particular, the swirling air currents 86 help maintain the turbulent airflow portion 90. The turbulent airflow portion 90 of the boundary layer 82 increases drag, which helps to hold air within the air curtain 74. As a result, a larger boundary layer 82 is created and the total required amount of airflow needed is reduced. As such, using the permeable material sheet 66 in addition to the air curtain 74 allows for the overall airflow, and corresponding power consumption used to create the airflow, to be reduced. In addition to aiding the turbulent airflow portion 90, the permeable material sheet 66 also provides the benefit of blocking large debris. More specifically, the permeable material sheet 66 blocks debris that is larger than the apertures 70 from entering the cab interior 30. Furthermore, the air curtain 74 aids in cleaning the permeable material sheet 66 should any debris collect on the permeable material sheet 66 while the vehicle is not in operation.

As a result of the barrier 38 created by the air curtain 74 and the permeable material sheet 66, the amount of debris that is able to enter the cab interior 30 is minimized. In some embodiments, the cab interior 30 may be pressurized relative to atmosphere on the exterior of the operator cab 14 in order to further improve the ability of the barrier 38 to prevent debris from entering the operator cab 14. In particular, a first side of the opening 34 (i.e., the cab interior 30) is pressurized relative to a second, opposite side of the opening 34 (i.e., outside of the cab 14) to aid in preventing debris from passing through the apertures 70. The cab interior 30 may be pressurized by the source of pressurized air 50. In particular, the cab interior 30 may be in fluid communication with the air plenum 62 formed in the canopy 22, which places the cab interior 30 in fluid communication with the source of pressurized air 50.

In typical operator cabs, a glass or plastic (e.g., polycarbonate) panel would cover the operator cab openings to allow an operator to see out the opening while protecting the operator from the exterior dust and debris. However, the glass or plastic panel that covers the operator cab openings often become scratched, chip, or otherwise marred during normal operation of the vehicle. In an underground mine application, the vehicle operator is typically wearing a head lamp as part of their personal safety equipment. The light from the operator's head lamp can hit the glass or plastic panel and the scratches, chips, etc. create glares of light that block or reduce the operator's visibility through the glass or plastic panel. In contrast, in the illustrated embodiment, the air curtain 74 and the permeable material sheet 66 are both transparent. The apertures 70 in the permeable material sheet 66 are formed and sized such that an operator is able to see through the permeable material sheet 66. As such, light from an operator's head lamp, for example, passes through both the air curtain 74 and the permeable material sheet 66 without being reflected as a glare while protecting the operator from the external debris and dust. In other words, the permeable material sheet does not substantially obscure an operator's vision outside of the cab. Either the material of the sheet is transparent or the operator can see through apertures formed in the material. Not substantially obscuring an operator's vision is meant to mean the operator is able to see clearly enough to operate the vehicle safely.

In operation, the source of pressurized air 50 generates an airflow 46 that flows through the duct 58 to the plenum 62 formed in the canopy 22 of the operator cab 14. From the plenum 62 the airflow 46 is distributed to the plurality of air nozzles 46 that direct the airflow 46 into air jets 78 oriented downwards and towards the permeable material sheet 66 covering the openings 34. The air jets 78 collectively form the air curtain 74 in front of the permeable material sheet 66, and the interaction of the air curtain 74 with the permeable material sheet 66 forms the plurality of swirling air currents 86 within the apertures 70 of the permeable material sheet 66. The swirling air currents 86 support and maintain the turbulent airflow portion 90 of the boundary layer 82, improving the ability of the air curtain 74 to reject to airborne dust and debris. The permeable material sheet 66 prevents larger debris from entering the cab interior 30. As such, the air curtain 74 and the permeable material sheet 66 collectively form the barrier 38. The barrier 38 prevents dirt or debris from entering the operator cab 14, while still allowing an operator to see clearly out of the operator cab 14, even while wearing a head lamp.

In an alternative embodiment, the plurality of air nozzles 42 and the corresponding air curtain 74 can be positioned in the cab interior 30. In other words, the relative positions the permeable material sheet 66 and the air curtain 74 can be swapped. In further alternative embodiments, an air curtain is included on each side of the permeable material sheet (i.e., one air curtain on the exterior and one air curtain on the interior of the permeable material sheet). In further alternative embodiments, the operator cab 14 can be for any type of vehicle that can benefit from increased visibility and increased debris rejection (e.g., an underground loader, a surface mine crusher, construction vehicles, etc.). Also, the above-described barrier 38 including the air curtain 74 and the permeable material sheet 66 can be utilized on any apparatus including an opening and is not limited to openings formed on operator cabs.

Various features and advantages of the invention are set forth in the following claims.

What is claimed is:

1. A vehicle including an operator cab, the operator cab comprising:
   a frame defining an opening;
   a permeable material sheet mounted adjacent the frame to at least partially cover the opening, the permeable material sheet having a plurality of apertures; and
   an air nozzle positioned proximal to the opening and positioned so that the air nozzle directs an airflow to contact at least a portion of the permeable material sheet to form a swirling air current proximal to at least one of the plurality of apertures.

2. A vehicle according to claim 1, wherein the air nozzle is in fluid communication with a source of pressurized air.

3. A vehicle according to claim 2, wherein the vehicle includes an air plenum in fluid communication with the air nozzle and the source of pressurized air.

4. A vehicle according to claim 1, wherein the permeable material sheet covers the entire opening.

5. A vehicle according to claim 1, wherein the air nozzle is one of a plurality of nozzles that are each positioned proximal to the opening and oriented at an angle toward the permeable material sheet.

6. A vehicle according to claim 1, wherein the swirling air current is formed inside the at least one of the plurality of apertures.

7. A vehicle according to claim 1, wherein the airflow and the portion of the permeable material sheet in contact with the airflow are transparent.

8. A vehicle according to claim 7, wherein light passes through the airflow and the portion of the permeable material sheet in contact with the airflow without being reflected as a glare.

9. A vehicle according to claim 1, wherein the frame partially defines a cab interior, and wherein the cab interior is pressurized.

10. A vehicle according to claim 1, wherein the swirling air current is one of a plurality of swirling air currents, and wherein the plurality of swirling air currents are formed inside the plurality of apertures.

11. A vehicle according to claim 10, wherein the airflow defines a boundary layer adjacent to the permeable material sheet; the boundary layer including a turbulent airflow portion and a laminar airflow portion, the turbulent airflow portion positioned closer to the permeable material sheet than the laminar airflow portion.

12. An operator cab comprising:
    a frame defining an opening;
    a permeable material sheet mounted on the frame and at least partially covering the opening, the permeable material sheet having a plurality of apertures; and
    at least one nozzle mounted adjacent the frame, the nozzle being in fluid communication with a pressurized air source to create an air curtain directed along the permeable material sheet such that the air curtain contacts at least a portion of the permeable material sheet to form a boundary layer adjacent to the permeable material sheet and a plurality of swirling air currents within the plurality of apertures to prevent debris from traveling through the opening.

13. An operator cab according to claim 12, wherein the permeable material sheet covers the entire opening.

14. An operator cab according to claim 13, wherein the air curtain contacts over half of the permeable material sheet.

15. An operator cab according to claim 12, wherein the air curtain and the portion of the permeable material sheet in contact with the air curtain are transparent.

16. An operator cab according to claim 15, wherein light passes through the airflow and the portion of the permeable material sheet in contact with the airflow without being reflected as a glare.

17. An operator cab according to claim 12, wherein a first side of the opening is pressurized relative to a second side of the opening.

18. An operator cab for a vehicle, the operator cab comprising:
    a frame defining an opening;
    a permeable material sheet mounted adjacent the frame to at least partially cover the opening, the permeable material sheet having a plurality of apertures; and
    a plurality of air nozzles positioned proximal to the opening and positioned so that the air nozzles direct airflow to contact at least a portion of the permeable material sheet to form a plurality of swirling air currents, the plurality of swirling air currents being formed within the plurality of apertures; and so that
    the airflow that contacts at least a portion of the permeable material sheet also forms a boundary layer adjacent to the permeable material sheet; wherein the boundary layer includes a turbulent airflow portion and a laminar airflow portion, the turbulent airflow portion positioned closer to the permeable material sheet than the laminar airflow portion; and wherein
    the airflow and the portion of the permeable material sheet in contact with the airflow are transparent such that light passes through the airflow and the portion of the permeable material sheet in contact with the airflow without being reflected as a glare.

19. The operator cab of claim 18, further comprising a cab interior at least partially defined by the frame, wherein the cab interior is pressurized.

20. The operator cab of claim 19, further comprising an source of pressurized air producing the airflow and a flow of air to the cab interior to provide the pressurization.

* * * * *